(12) United States Patent
Messmer et al.

(10) Patent No.: US 7,769,702 B2
(45) Date of Patent: Aug. 3, 2010

(54) METHOD AND SYSTEM FOR TRAINING A HEARING AID USING A SELF-ORGANISING MAP

(75) Inventors: Philippe Messmer, Berne (CH); Sigi Wyrsch, Berne (CH); Martin Klauser, Suhr (CH)

(73) Assignee: Bernafon AG, Berne (CH)

(*) Notice: Subject to any disclaimer, the term of this patent is extended or adjusted under 35 U.S.C. 154(b) by 1277 days.

(21) Appl. No.: 11/245,261

(22) Filed: Oct. 7, 2005

(65) Prior Publication Data

US 2006/0179018 A1    Aug. 10, 2006

(30) Foreign Application Priority Data

Feb. 9, 2005    (EP) .................................. 05100877

(51) Int. Cl.
*G06E 1/00* (2006.01)
*G06E 3/00* (2006.01)
*G06F 15/18* (2006.01)
*G06G 7/00* (2006.01)

(52) U.S. Cl. ........................................................ 706/16
(58) Field of Classification Search .................. None
See application file for complete search history.

(56) References Cited

U.S. PATENT DOCUMENTS

| 5,267,165 | A | 11/1993 | Sirat et al. |
| 5,634,063 | A | 5/1997 | Ahn et al. |
| 5,754,661 | A | 5/1998 | Weinfurtner |
| 2003/0112987 | A1 | 6/2003 | Nordqvist et al. |
| 2003/0144838 | A1 | 7/2003 | Allegro |

OTHER PUBLICATIONS

'Subband signal processing for hearing aids': Wyrech, 1999, IEEE, 0-7803-5471-0, pp. III-29 through III-32.*
'Emements of artificial neural networks': Mehrotra, MIT press, 1997.*
'Subband signal processing for hearing aids': Wyrsch, 1999, IEEE, 0-7803-5471, pp. III-29-III-32.*
'Elements of Artificial Neural Networks': Mehrotra, 1996, MIT press.*

* cited by examiner

*Primary Examiner*—Donald Sparks
*Assistant Examiner*—Peter Coughlan
(74) *Attorney, Agent, or Firm*—Birch, Stewart, Kolasch & Birch, LLP (57) ABSTRACT

This invention relates to a system (100) and method for selecting a signal processing program to be executed by a signal processor in a hearing aid. The system (100) comprises a single layer of neurons (200) each having one or more neighbours and being arranged in a memory device (106), wherein each neuron comprises a neuron vector referring to a specific acoustic situation and a neuron label referring to signal processing program associated with said specific acoustic situation. The system (100) further comprises a sensor adapted to detect an external acoustic situation and to define a sensor vector associated with said external acoustic situation, and wherein a processor (102) calculates a vector difference between said sensor vector and each of the neuron vectors, identifies that neuron providing the smallest vector difference, and selects a signal processing program referred to by a neuron label of that neuron.

27 Claims, 5 Drawing Sheets

METHOD AND SYSTEM FOR TRAINING A HEARING AID USING A SELF-ORGANISING MAP

FIELD OF INVENTION

This invention relates method and system for training a hearing aid using a self-organising map (SOM) neural network for performing automatic program selection.

BACKGROUND OF INVENTION

U.S. Pat. No. 6,044,163 discloses a hearing aid comprising an input transducer, an amplifier and transmission circuit, an output transducer and a calculating unit working according to the principle of a neural structure. The calculating unit performs a classification in order to modify the transmission characteristics in dependence on the auditory situation. The training is distinguished between, firstly, a non-supervised training, which occurs according to a predetermined matrix only upon evaluation of an event signal generated by the calculating unit, and, secondly, a supervised training where a matching module evaluates a desired target reply in addition to the event signal. The US patent provides an approach using a neural structure, which may be trained during the operating mode. However, since the disclosed neural structure comprises a multi-layer neural network an intensive calculation in order to update the neuron weights is required.

International patent application WO 2004/056154 discloses a hearing device having an input transducer, an output transducer, and signal processing means for influencing a signal in the hearing device in accordance with a processing parameter set (PPS). A PPS memory accessible by the signal processor means stores a number of different PPS's for use by the signal processing means. The system further has means for monitoring the acoustic environment in a learning mode, where the user selects a PPS. Later in an automatic mode the hearing device selects a PPS based on a comparison between the current acoustic environment and the monitored environment in the learning phase. This hearing device discloses a classification system where the most representative characterizing acoustic values are calculated for each PPS. However, the performance may decrease, if a PPS has to be used for different characterizing acoustic values. That is, according to this hearing device a characterizing acoustic value matches a similar PPS.

SUMMARY OF THE INVENTION

An object of the present invention is to provide an improved method and system for training a hearing aid using neural network to perform an automatic program selection based on a plurality of characterizing acoustic values.

In particular, the object of the present invention is to enable plurality of sets of characterizing acoustic values result in selection of one program.

A particular advantage of the present invention is the provision of a system which does not require large computing capabilities.

A particular feature of the present invention is the provision of enabling the end-user to train the hearing aid during the operation of the hearing aid in real-life situations.

The above objects, advantage and feature together with numerous other objects, advantages and features, which will become evident from below detailed description, are obtained according to a first aspect of the present invention by a system for selecting a signal processing program to be executed by a signal processor in a hearing aid and comprising a single layer of neurons each having one or more neighbours and being arranged in a memory device, and each neuron comprising a neuron vector referring to a specific acoustic situation and a neuron label referring to signal processing program associated with said specific acoustic situation, and comprising a sensor adapted to detect an external acoustic situation and to define a sensor vector associated with said external acoustic situation, wherein said processor is adapted to calculate a vector difference between said sensor vector and each of said neuron vectors, to identify that neuron providing the smallest vector difference, and to select a signal processing program referred to by a neuron label of that neuron.

The system according to the first aspect of the present invention provides an automatic selection of signal processing program based on the trained grid of neurons. The selection ensures that the most probable acoustic situation is identified and appropriately dealt with.

The system according to the first aspect of the present invention may be operable in one or more training phases and an operating phase. The operating phase is to be construed as a classification phase wherein the hearing aid is in operation, and the training phases are to be construed as phases during which the value of the neuron labels are selected and adapted and during which associated acoustic situations stored.

The sensor according to the first aspect of the present invention may comprise a first detector for detecting signal level in one or more frequency bands and providing a first parameter for the sensor vector, a second detector for detecting modulation index in one or more frequency bands and providing a second parameter for the sensor vector, a third detector for detecting speech and providing a third parameter for the sensor vector, and fourth detector for detecting a speech to noise ratio and providing a fourth parameter for the sensor vector. A wide variety of detectors may be implemented in the system, in order to accomplish any desired response of the signal processor. The detectors, however, should allow for distinguishing between different external acoustic situations.

The single layer of neurons according to the first aspect of the present invention may further be arranged in a ring-shaped, quadratic, rectangular, hexagonal configuration or any combination thereof. That is, each neuron may be arranged with 2, 4, 6 or 8 neighbouring neurons. The configuration of the single layer of neurons is particular important during the training phases. Hence the single layer of neurons may generally be connected in any networking shape such as ring or torus.

The single layer of neurons according to the first aspect of the present invention may be arranged as a self-organizing map (SOM). When the single layer of neurons is configured in a quadratic, rectangular, or hexagonal configuration, the single layer of neurons may comprise a grid length larger than 2 neurons and a grid width larger than 2 neurons. The grid of neurons may thus be arranged as a 5 neurons by 5 neurons grid. The grid size is chosen so as to provide a required number of specific acoustic situations. The grid size is, however, restraint by the size of the memory device.

The vector difference according to the first aspect of the present invention may be calculated as Euclidian distance:

$$dist = \sqrt{\sum_{i=1}^{d} M(i)|a(i) - b(i)|^2},$$

Equation 1 where 'i' comprises an index number, 'M' comprises a weighting variable enabling weighting of each parameter in the sensor vector, 'd' comprises dimension of neurons, 'a' comprises a neuron vector, and 'b' comprises a sensor vector.

The memory device according to the first aspect of the present invention may further be adapted to store training data, which comprises an end-user's signal processing program preferences. The end-user's preferences comprising operation parameters and signal processing program choices may be stored during the training phases of the system.

During the training phases of the system the end-user may adjust operation parameters of the system or change between signal processing programs and thereby provide generation of a control setting to the training data for a particular acoustic situation. For example, by adjusting operating parameters of the signal processing program or by selecting a different signal processing program for a particular external acoustic situation the end-user may cause the system to generate a control setting to be input to the training data. The control setting may comprise the actual adjustments performed by the end-user or may comprise a differentiation of the actual adjustments performed by the end-user. Hence a particular advantageous system is obtained since if the end-user, for example, increases the gain by 6 dB the gain of the hearing aid is increased by 6 dB, but the control setting input to the training data may be a gain increase of 2 dB.

The signal processor according to the first aspect of the present invention may further be adapted to generate the neuron label based on the training data. The end-user's responses to the system's selection of a signal processing program are used in a training phase to determine a value of the neuron label for a specific acoustic situation. The neuron label refers to an associated signal processing program. Hence the system learns during the training phase which signal processing programs the end-user prefers to be used during a specific acoustic situation. This is a great advantage since the hearing aid thereby achieves a simple customization.

The system according to the first aspect of the present invention may further comprise a first counter adapted to record a number of counts for use of each signal processing program in a specific acoustic situation. During the training phase the end-user's selection of signal processing programs in a specific acoustic situation is counted and the signal processor utilises this information to provide a value for the neuron label. The signal processing program selection with most 'hits' during a specific acoustic situation determines the value of the neuron label.

The signal processor according to the first aspect of the present invention may further be adapted to identify a signal processing program having the highest number of counts in the first counter and a signal processing program having the second to highest number of counts in the first counter, and to compare a first difference between the highest number of counts in the first counter and the second to highest number of counts in the first counter with a first threshold. In case the first difference is lower than the first threshold the signal processor may set the value of the neuron label to zero or null. Thus during operation of the system in situations where the acoustic situation results in a selection of a neuron having a neuron label with a zero value, the signal processor may select a signal processing program used prior to change of acoustic situation.

When the first difference is little the confidence level is low and therefore the system advantageously preserves the running signal processing program rather than changing to a new signal processing program having a low confidence level.

Alternatively, the signal processor may disable each neuron having neuron label with a zero value. Hence the low confidence level for selecting a signal processing program is eliminated.

The system according to the first aspect of the present invention may further comprise a second counter adapted to record a number of counts for overall use of each signal processing program, and wherein the signal processor may be adapted to execute that signal processing program with the highest number of counts in said second counter. Hence the selected signal processing program is not necessarily executed until it has been counted the highest number of times. This is, in effect, a means for advantageously delaying program changes thereby prevented abrupt program changes.

Thus the signal processor may be adapted to compare a second difference between highest number of counts in the second counter and number of counts for a presently running signal processing program in the second counter with a second threshold, and in case the second difference is lower than the second threshold the presently running signal processing program is executed. Hence fluctuation in program selection is smoothed.

The above objects, advantages and features together with numerous other objects, advantages and features, which will become evident from below detailed description, are obtained according to a second aspect of the present invention by a method for selecting a signal processing program to be executed by a signal processor in a hearing aid comprising a single layer of neurons each having one or more neighbours and being arranged in a memory device, and each neuron comprising a neuron vector referring to a specific acoustic situation and a neuron label referring to signal processing program associated with the specific acoustic situation, and said method comprising detecting an external acoustic situation and to define a sensor vector associated with said external acoustic situation by means of a sensor, calculating a vector difference between said sensor vector and each of said neuron vectors by means of a signal processor, identifying that neuron providing the smallest vector difference by means of said signal processor, and selecting a signal processing program referred to by a neuron label of that neuron by means of said signal processor.

The method according to the second aspect of the present invention provides excellent means for a hearing aid end-user to perceive a optimum sound in a wide variety of acoustic situations.

The method according to the second aspect of the present invention may further comprise generating the neuron label based on training data. The neuron label as described above with reference to the system according to the first aspect of the present invention provides a pointer means for a specific signal processing program.

The method according to the second aspect of the present invention may further comprise recording a number of counts for use of each signal processing program in a specific acoustic situation by means of a first counter. The first counter advantageously keeps track of the number of times a particular signal processing program has been selected for a particular acoustic situation.

The method according to the second aspect of the present invention may further comprise identifying a signal processing program having the highest number of counts and a signal processing program having the second to highest number of counts in the counter, and comparing a first difference between the highest number of counts and the second to highest number of counts with a first threshold by means of the signal processor. The method may comprise setting the value of the neuron label to zero or null in case the first difference is lower than the first threshold by means of the signal processor. Alternatively, the method may comprise disabling each neuron having neuron label with a zero value by means of the signal processor.

The method according to the second aspect of the present invention may further comprise recording a number of counts for overall use of each signal processing program by means of a second counter, and executing that signal processing program with the highest number of counts by means of the signal processor.

The method according to the second aspect may further comprise comparing a second difference between highest number of counts for overall use and number of counts for a presently running signal processing program with a second threshold, and in case the second difference is lower than the second threshold executing the presently running signal processing program by means of the signal processor. The second counter advantageously keeps track of the selection of all signal processing programs in order to ensure that no abrupt program changes are achieved.

The method according to the second aspect of the present invention may incorporate any features of the system according to the first aspect of the present invention.

The above objects, advantage and feature together with numerous other objects, advantages and features, which will become evident from below detailed description, are obtained according to a third aspect of the present invention by a computer program to be run by on the system according to the first aspect of the present invention and comprising operations as defined in the method according to the second aspect of the present invention.

The above objects, advantage and feature together with numerous other objects, advantages and features, which will become evident from below detailed description, are obtained according to a fourth aspect of the present invention by a hearing aid comprising a system according to the first aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilized and structural and functional modifications may be made without departing from the scope of the present invention.

Figure 1:
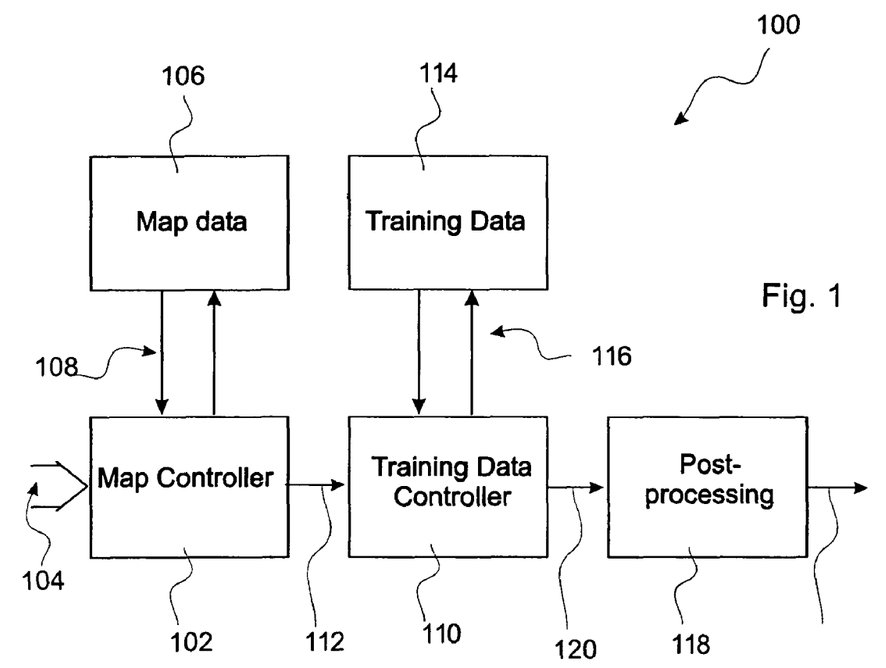
FIG. 1, shows a neural networking system according to a first embodiment of the present invention.

FIG. 1 shows a neural networking system according to a first embodiment of the present invention and designated in entirety by reference numeral 100. The system 100 comprises a map controller 102 receiving information from a one or more environment sensors, which information is indicated by arrow 104. The information 104 from the environment sensors defines a vector to which the system 100 must find a most probable corresponding acoustic situation. The map controller 102 compares the vector of the information 104 with sets of acoustic situations stored in map data memory 106 through communication channels 108.

The system 100 is operated in one or more training phases and an operating phase, which generally is referred to as the classification phase. The operation of the system 100 in its training phases is described below with reference to FIGS. 3 to 5, and firstly the system 100 is described in its operating/classification phase.

The environment sensors may according to the first embodiment of the present invention detect environmental signal properties, which should allow for distinguishing different acoustic situations. The environment sensors may for example comprise detectors for detecting environmental signal level in one or more frequency bands, a detector for detecting modulation index in one or more frequency bands, a speech detector, and a speech to noise ratio detector. That is, the acoustic situation is defined by the detected environmental signal properties having acoustic parameters detected by the environmental sensors.

Figure 2:
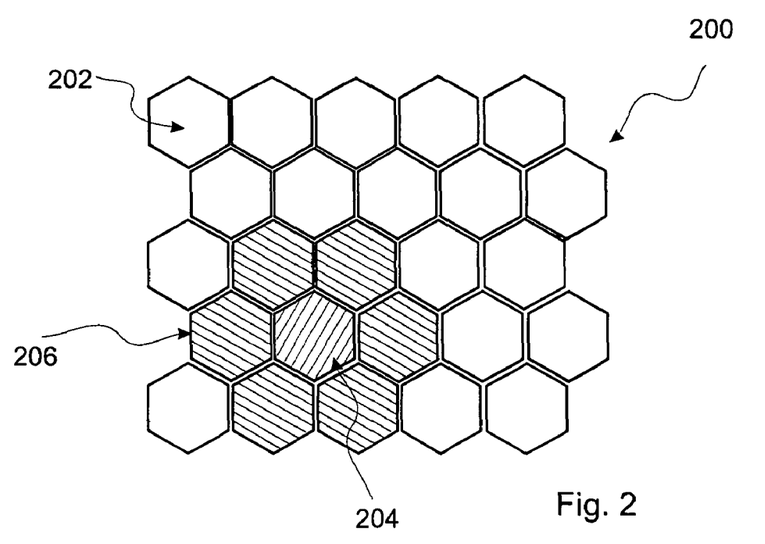
FIG. 2, shows a schematically view of a two-dimensional grid of neurons in the system according to the first embodiment of the present invention.

The map data memory 106 comprises a two-dimensional grid of neurons 200 as shown in FIG. 2, in which grid the neurons 202 are typically nested like hexagons. That is, nested with six neighbouring neurons. However, as is obvious to the person skilled in the art the neurons may be nested in any appropriate way. The grid 200 is a self-organising map (SOM) with a preferred size of five by five neurons. Each neuron 202 is a vector comprising 'n' values, where 'n' is the number of acoustic parameters defining the acoustic situation.

During the operating phase of the system 100, shown in FIG. 1, the map controller 102 computes the difference between the vector defined by the environmental sensors and the vector defined in each neuron i.e. the neuron-vector. The difference is typically calculated by equation 1, as Euclidian distance, where 'M' is a weighting variable enabling weighting of the individual environmental parameters so as to weight the parameters according to their relevance to environmental classification. The term "environmental classification" is in this context to by construed as the determination of the most probable acoustic situation.

When the most probable acoustic situation has been determined by the map controller 102 by selecting that neuron 202 having a neuron-vector showing the smallest difference with the vector defined by the environmental sensors, the map controller 102 communicates the coordinates of said neuron 202 the to a training data controller 110 through channel 112. Based on the coordinates of said neuron 202 communicated to the training data controller 110, the training data controller 110 decides which acoustic program is most likely to mirror the preferences of the end-user.

The decision of the training data controller 110 is based on training data stored in a training data memory 114, which training data comprises end-user preferences stored during a training phase of the system 100. The training data controller 110 communicates with the training data memory 114 through channels 116.

The training data memory 114 comprises cyclic buffers storing the program preferences. Each neuron 202 of the grid 200 in the map data 106 corresponds to a cyclic buffer in the training data memory 114 having 'p' entries, where 'p' is the number of acoustic programs. The term 'cyclic buffer' is in this context to be construed as a buffer comprising a number of single cyclic buffers, where a single cyclic buffer is a way to log the number of hits a specific acoustic program receives.

When an acoustic program is selected by the training data controller 110 the associated single cyclic buffer is set to "1", while the other single cyclic buffers are set to "0". As will be obvious to a person skilled in the art the associated single cyclic buffer may alternatively be set to "0", while the other single cyclic buffers are set to "1", however, this will cause some dependent changes to be made when evaluating the count-values. A plurality of counters in the training data controller 110 continuously counts the value of each single cyclic buffer between each acoustic program selection. Hence the acoustic program corresponding to the counter with the highest value is selected as the best matching acoustic program.

The winning acoustic program provides a new label value to that neuron 202 comprising the neuron-vector closest to the vector describing the acoustic situation.

When the difference between the highest counter value and the other counter values is low, the information of the most probable program is less confident. Therefore a condition may be applied to the selection of the winning acoustic program. If the difference between the highest counter value and the second highest value is below a given margin, the associated label is set to zero. During the classification process, when the label of the best matching neuron is zero, the label of the previous best matching neuron is selected and communicated to the post-processing unit.

In an alternative embodiment the neurons labelled with zeroes are disabled. The best-matching neuron is then searched among the enabled neurons.

The training data controller 110 communicates which acoustic program is most likely to mirror the preferences of the end-user to a post-processing unit 118 through channel 120. The post-processing unit 118 reduces environmental classification errors by smoothing fluctuations in acoustic program selection. Similar to the training data memory 114 the post-processing unit 118 comprises a cyclic buffer having a number of entries corresponding to the number of acoustic programs. When a selected acoustic program is communicated from the training data controller 110 to the post-processing unit 118, the entry corresponding to the selected acoustic program is set to '1' while the other entries are set to '0'. As before a counter tracks the number of '1's of each entry. The acoustic program corresponding to the counter with the highest value is the selected acoustic program, which is communicated, for example by means of a pointer i.e. memory address, to an execution processor illustrated by arrow 122. If the acoustic program, which has the highest counter value, changes, it must overstep the counter value corresponding to the presently or currently active acoustic program by a predefined margin in order to become a new best matching acoustic program. That is, a hysteresis function is applied to the counter values.

The map data in the map data memory 106 comprises N=9, 16 or preferably 25 vectors of dimension 'n', where 'N' is the number of neurons and 'n' is number of acoustic parameters defining the acoustic situation. Each vector may have a 2-bit resolution or higher, which is given by environmental sensors. In the first embodiment of the present invention the rough training phase is performed off-line on for example a personal computer. Therefore the map topology does not need to be stored in the hearing aid.

The training data in the training data memory 114 comprises 'N' cyclic buffers with 'p' entries, where 'p' is the number of acoustic programs. The cyclic buffers may have a size between 64 and 128 and the associated counters may be implemented as a counter of respectively 6 or 7 bits.

The post-processing unit 118 comprises a cyclic buffer with 'p' entries having a length of 8, 16, 32, or 64 bits.

The system 100 is described with reference to a classification phase, however, before the system 100 is ready for performing classification, the system 100 must be trained.

The training phase comprises adapting data in the map data memory 106 and in the training data memory 114. The adaptation is performed in three training processes: a rough training phase, shown in FIG. 3; a fine tuning phase, shown in FIG. 4; and a labelling phase, shown in FIG. 5.

Figure 3:
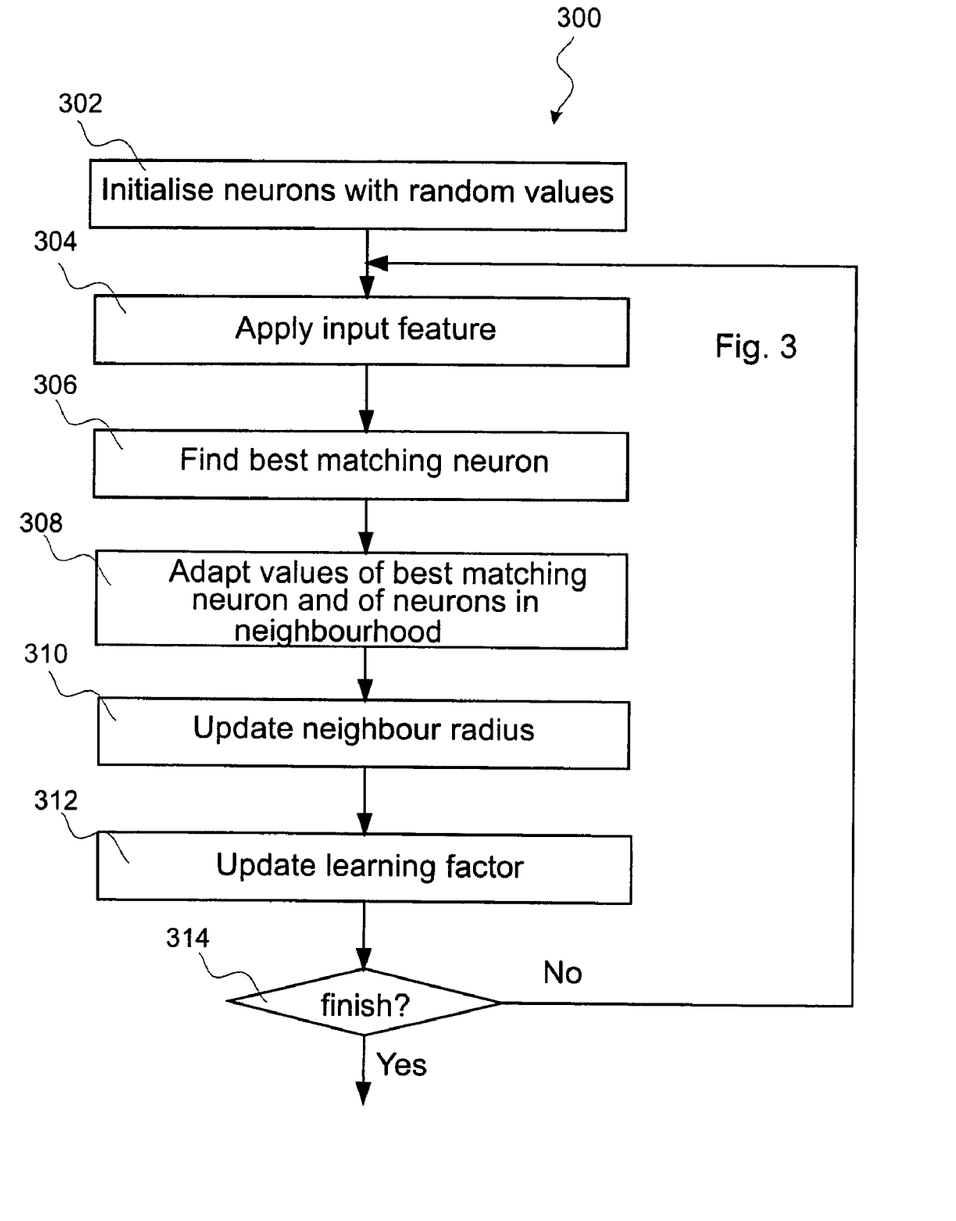
FIG. 3, shows a flow chart of a rough training phase for the system according to the first embodiment of the present invention.

The rough training phase designated in entirety by reference numeral 300 comprises unsupervised training, i.e. the training is performed without training data concerning acoustic program affiliation of the environmental acoustic parameters detected by the environmental sensors.

The object of the rough training phase 300 is to adapt neuron-values in the grid 200 so as to map the distribution of environmental acoustic parameter values. During a first step 302, the neuron-vectors 202 are initialised with random values. During a second step 304 environmental acoustic parameters input to the system 100 are used to define an environmental vector.

Subsequently, during a third step 306 the environmental vector is compared to all neuron-vectors 202, and during a fourth step 308 the best matching neuron-vector, exemplified in FIG. 2 by reference numeral 204, is modified so that the difference between the environmental vector and the neuron-vector 204 is decreased. Further in the step 308 the neighbouring neurons 206 within a predetermined radius are also updated in accordance with a weighting function relative to the best matching neuron.

The neurons 204 and 206 are changed in accordance with equation 2.

$$m_i(t+1)=m_i(t)+\alpha(t)*N_c(t)*[m_c(t)-m_i(t)], \quad \text{Equation 2}$$

where $m_i$ and $m_c \in \Re^n$. The index 'c' indicates the best matching neuron 204. The function $\alpha$ defines the learning rate, which is decrease over time, and $\alpha$ is given by equation 3.

$$\alpha(t) = \alpha_0 * \frac{A}{A+t}, \quad \text{Equation 3}$$

where A is a constant.

The neuron 204 represents the best matching neuron and the neurons designated by reference numeral 206 represent those neurons, which are affected by an update in accordance with equation 2, the definition for $N_c(t)$ satisfying $N_c(t)=0$ for radius (t) larger than one. A more complex definition of $N_c(t)$, which can be used for off-line simulations, is given by equation 4:

$$N_c(t) = e^{-0.5*\left(\frac{r}{radius(t)}\right)^2}, \quad \text{Equation 4}$$

where radius(t) decreases linearly from the initial radius down to one. The total weight ($\alpha*Nc$) can be then scaled with $\alpha_0$ and A of equation 3. The steepness of the radius function is set so that the decreasing time corresponds to the assumed training time.

During a fifth step 310 the function $N_c(t)$ defining the neighbourhood or the radius and decreasing over time is updated. At this step the new $N_c$ and $\alpha$ are computed for the next loop.

During a sixth step 312 the function $\alpha$ defining the learning rate and decreasing over time is updated. In an alternative embodiment of the present invention the fifth and sixth steps 310 and 312 are removed and a third prime and third double prime steps are inserted before the fourth step 308. The third prime step computes a new neighbour radius and the third double prime step computes a new learning factor.

Finally, in a seventh step 314 according to the first embodiment of the present invention the rough training period has concluded a first iteration. Further iterations may be initiated or the rough training phase 300 may be terminated.

Figure 4:
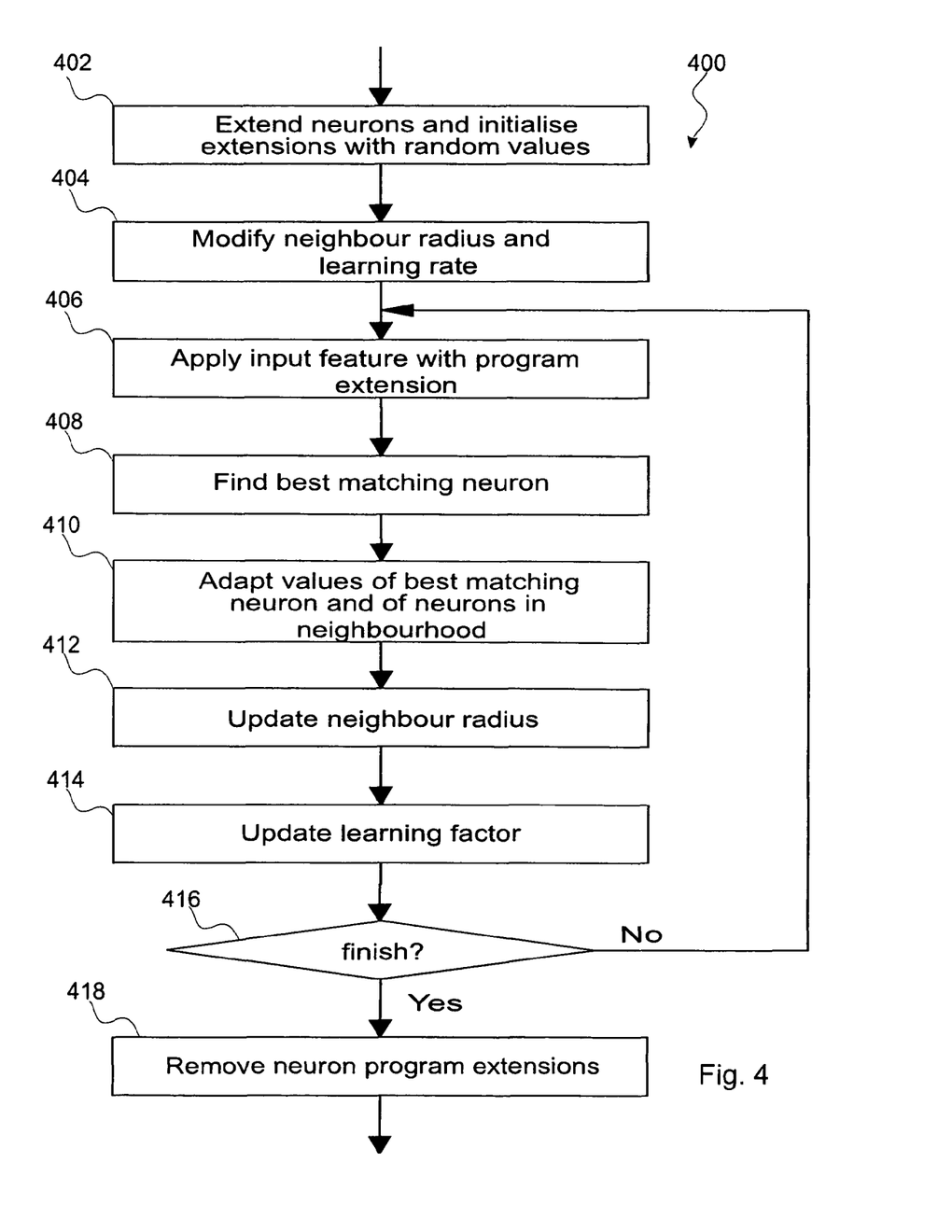
FIG. 4, shows a flow chart of a fine tuning phase for the system according to the first embodiment of the present invention.

FIG. 4 shows the fine tuning phase designated in entirety by reference numeral 400. The fine tuning phase 400 is contrary to the rough training phase 300 a supervised process. The object of the fine tuning phase 400 is to group any of the neurons 202 together according to probable acoustic program.

During a first step 402 the neurons 202 are extended and the extensions are initialised with random numbers. The term "extension" is in this context to be construed as adding further parameter to each of the neuron. The further parameter refers to an acoustic program.

During a second step 404 the radius and the learning rate is modified. That is, the radius is decreased and the learning rate is maintained. However, principally the neighbour weight and the learning factor may get new values, which can differ from the initial rough training values.

During a third step 406, in addition to the environmental sensors, the environmental vector is extended with a program extension and input to the map controller 102. Subsequently, the map controller 102 searches for the best match between the extended neurons and the extended environmental vector.

During a fourth step 408, a fifth step 410, a sixth step 412, and seventh step 414, steps 306, 308, 310 and 312 as described with reference to FIG. 3 are performed in the fine tuning phase 400.

In an eighth step 416 the fine tuning phase 400 has concluded a first iteration. Further iterations may be initiated or the fine training phase 400 may be terminated by performing a ninth step 418, during which the extensions on the neurons are removed.

When the fine tuning is completed the map topology in the map data memory 106 is no longer required, only the value of the neuron-vectors 204 is relevant.

Figure 5:
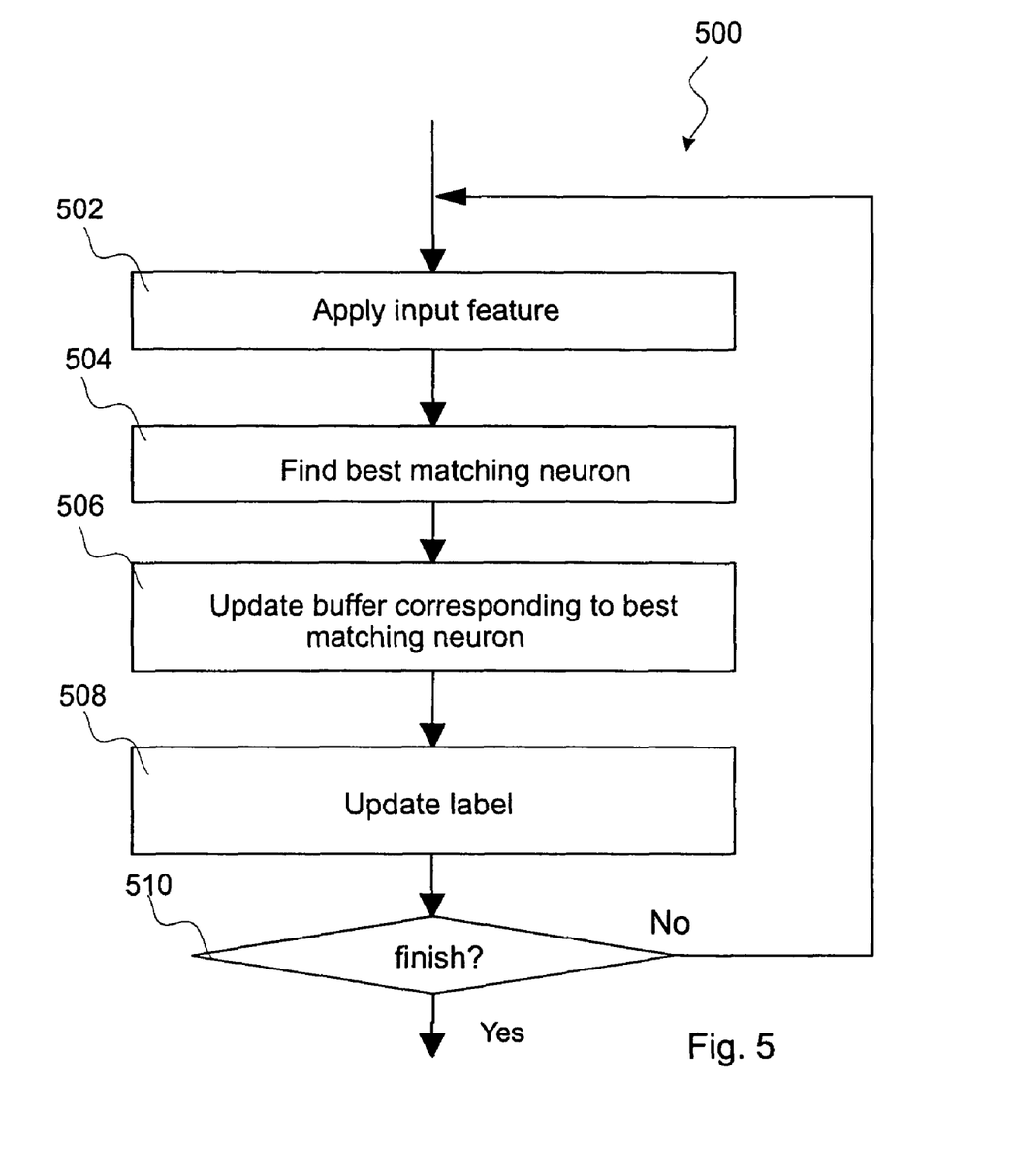
FIG. 5, shows a flow chart of a labelling phase for the system according to the first embodiment of the present invention.

FIG. 5 shows the labelling phase designated in entirety by reference numeral 500. The object of the labelling phase 500 is to match each neuron 202 with an acoustic program. The matching is performed on the basis of end-user input, step 504. That is, every time the end-user changes an acoustic program or maintains an acoustic program for a certain time the training data corresponding to an acoustic program in the training data memory 114 is updated, step 506.

A described above with reference to FIG. 1 the training data memory 114 comprises a cyclic buffer with 'p' entries for each program, and the cyclic buffer entry corresponding to the identified acoustic situation is fed by '1', and the other entries are fed by '0'. More than one value may be fed into the cyclic buffer entries simultaneously depending on the desired training speed. In addition, if fluctuation of the acoustical situation is high all entries corresponding to acoustic situations occurring a time period following the end-user input may advantageously be implemented.

The winning acoustic program is thus computed for each cyclic buffer entry. As mentioned above with reference to FIG. 1 the index of the cyclic buffer entry which has the highest counter value gives the winning acoustic program. The cyclic buffer entry is then labelled with the computed acoustic program number. If the difference between a highest counter value and a second to highest counter value is below a predetermined threshold the cyclic buffer entry is labelled zero. Every time a cyclic buffer is updated with a new training end-user input the labels are updated, step 508.

As soon as the system training is completed the cyclic buffers of the training data may be removed as long as the label for each cyclic buffer is maintained.

The most probable training scenario is to perform the rough training phase 300 and the fine-tuning phase 400 off-line on a personal computer and the labelling phase 500 during the operating of the hearing aid, since the labelling phase 500 does not need much computing resources. An initial default training set for the labelling phase 500 may however be advantageous. For an off-line fine-tuning phase 400, the end-user input may be replaced by an objective group assignment. Instead of assigning the environment sensor signals to the acoustic program chosen by the end-user, the environment acoustic situations would be objectively assigned to a signal category (e.g. speech, speech in noise, music, machine noise). Note that the fine-tuning phase 400 optimises the map organisation and is therefore an optional training phase.

Figure 6:
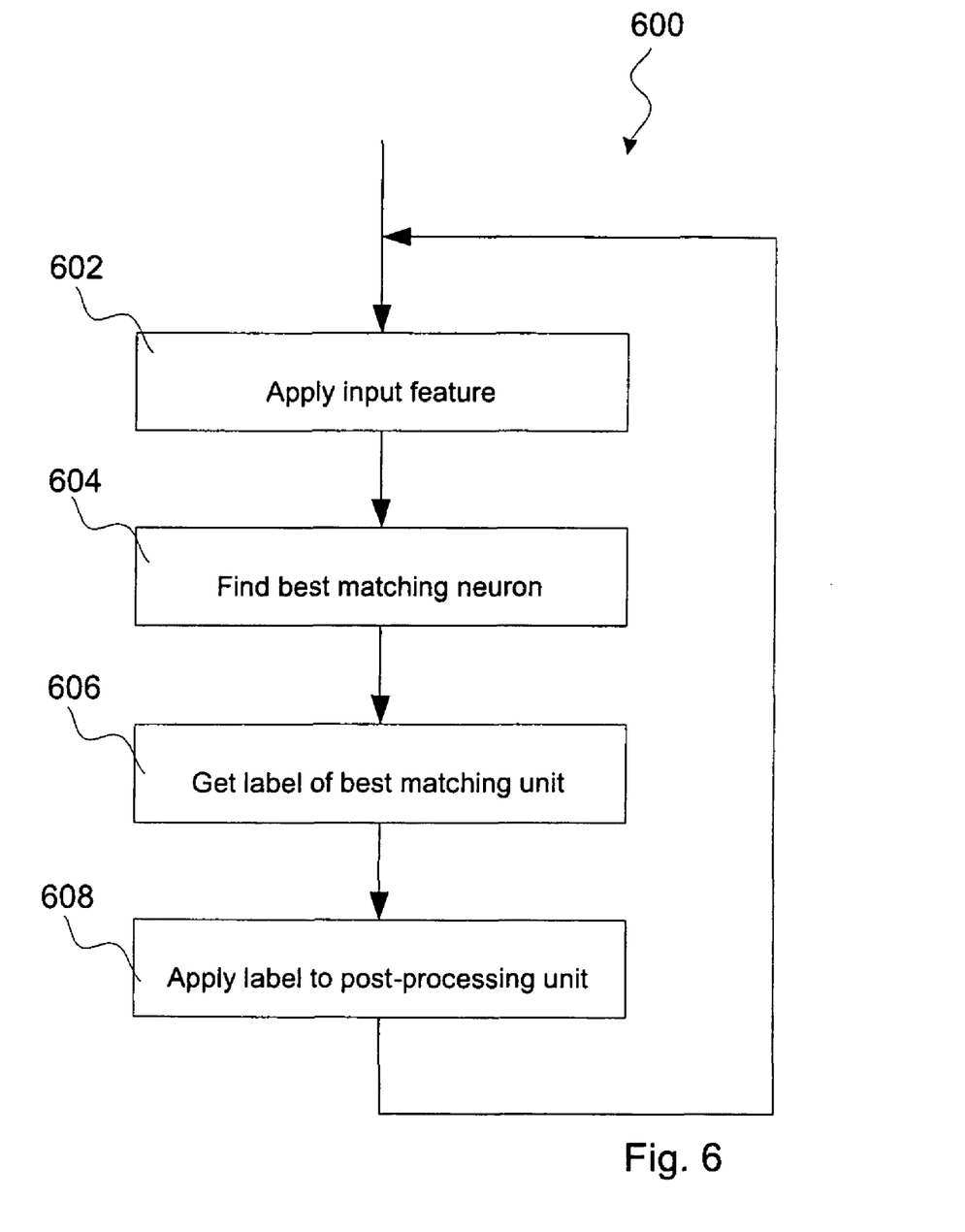
FIG. 6, shows a flow chart for the system according to the first embodiment in an operation phase.

FIG. 6 shows the system 100 in the operation phase 600 comprising a first step 602 during which the environmental vector is recorded, a second step 604 during which the environmental vector is compared with the neuron-vectors 202 and a best match is identified, a third step 606 during which a label is identified for the best match, and finally a fourth step 608 during which the label is communicated to the post-processing unit 118.

The invention claimed is:

1. A system for selecting a signal processing program to be executed by a signal processor in a hearing aid and comprising:

a single layer of neurons each having one or more neighbors and being arranged in a memory device, and each neuron including
a neuron vector referring to a specific acoustic situation and
a neuron label referring to signal processing program associated with said specific acoustic situation, and
a sensor that detects an external acoustic situation and defines a sensor vector associated with said external acoustic situation and includes a detector that detects a speech to noise ratio and provides a parameter for said sensor vector; and
a processor that
calculates a vector difference between said sensor vector and each of said neuron vectors,
identifies that neuron providing the smallest vector difference, and selects a signal processing program referred to by a neuron label of that neuron.

2. A system according to claim 1, wherein said sensor comprises a first detector that detects signal level in one or more frequency bands and provides a first parameter for said sensor vector.

3. A system according to any of claims 1 or 2, wherein said sensor comprises a second detector that detects modulation index in one or more frequency bands and provides a second parameter for said sensor vector.

4. A system according to claim 1, wherein said sensor comprises a third detector that detects speech and provides a third parameter for said sensor vector.

5. A system according to claim 1, wherein said single layer of neurons is arranged in a ring-shaped, quadratic, rectangular, hexagonal configuration or any combination thereof.

6. A system according to claim 5, wherein said quadratic, rectangular, or hexagonal configuration comprises a grid length larger than 2 neurons and a grid width larger than 2 neurons, such as having a grid length of 5 and a grid width of 5.

7. A system according to claim 1, wherein said single layer of neurons is arranged as a self-organizing map (SOM).

8. A system according to claim 1, wherein said memory device stores training data that includes one or more control settings generated in accordance with an adjustments of operating parameters of signal processing programs and/or selections between signal processing programs.

9. A system according to claim 1, wherein said signal processor generates said neuron label based on said training data.

10. A system according to claim 1, the system further comprising a first counter that records a number of counts for use of each signal processing program in a specific acoustic situation.

11. A system according to claim 10, wherein said signal processor identifies a signal processing program having the highest number of counts in said first counter and a signal processing program having the second to highest number of counts in said first counter, and compares a first difference between said highest number of counts in said first counter and said second to highest number of counts in said first counter with a first threshold.

12. A system according to claim 11, wherein said signal processor sets the value of said neuron label to zero when said first difference is lower than said first threshold.

13. A system according to claim 12, wherein said signal processor selects a signal processing program used prior to change of acoustic situation when the value of said neuron label is zero.

14. A system according to claim 12, wherein said signal processor disables a neuron when the value of said neuron label is zero.

15. A hearing aid comprising a system according to claim 1.

16. A system for selecting a signal processing program to be executed by a signal processor in a hearing aid and comprising:
a single layer of neurons each having one or more neighbors and being arranged in a memory device, and each neuron including
a neuron vector referring to a specific acoustic situation and
a neuron label referring to signal processing program associated with said specific acoustic situation, and
a sensor that detects an external acoustic situation and defines a sensor vector associated with said external acoustic situation, and
a processor that
calculates a vector difference between said sensor vector and each of said neuron vectors as Euclidian distance:

$$dist = \sqrt{\sum_{i=1}^{d} M(i)|a(i) - b(i)|^2},$$

where 'i' comprises an index number, 'M' comprises a weighting variable enabling weighting of each parameter in said sensor vector, 'd' comprises dimension of neurons, 'a' comprises a neuron vector, and 'b' comprises a sensor vector,
identifies that neuron providing the smallest vector difference, and
selects a signal processing program referred to by a neuron label of that neuron.

17. A system for selecting a signal processing program to be executed by a signal processor in a hearing aid and comprising:
a single layer of neurons each having one or more neighbors and being arranged in a memory device, and each neuron including
a neuron vector referring to a specific acoustic situation and
a neuron label referring to signal processing program associated with said specific acoustic situation,
wherein said memory device stores training data that includes one or more control settings generated in accordance with an adjustments of operating parameters of signal processing programs and/or selections between signal processing programs; and
wherein said one or more control settings include a recording of adjustments and/or selections made by the end-user and/or a differentiation of said adjustments and/or selections made by the end-user; and
a sensor that detects an external acoustic situation and defines a sensor vector associated with said external acoustic situation, and
a processor that
calculates a vector difference between said sensor vector and each of said neuron vectors,
identifies that neuron providing the smallest vector difference, and
selects a signal processing program referred to by a neuron label of that neuron.

18. A system for selecting a signal processing program to be executed by a signal processor in a hearing aid and comprising:
a single layer of neurons each having one or more neighbors and being arranged in a memory device, and each neuron including
a neuron vector referring to a specific acoustic situation and
a neuron label referring to signal processing program associated with said specific acoustic situation, and
a sensor that detects an external acoustic situation and defines a sensor vector associated with said external acoustic situation,
a processor that
calculates a vector difference between said sensor vector and each of said neuron vectors,
identifies that neuron providing the smallest vector difference, and
selects a signal processing program referred to by a neuron label of that neuron; and
a counter that records a number of counts for overall use of each signal processing program, and wherein said signal processor executes that signal processing program with the highest number of counts.

19. A system according to claim 18, wherein said signal processor compares a second difference between highest number of counts of said second counter and number of counts for a presently running signal processing program of said second counter with a second threshold, and executes the presently running signal processing program when said second difference is lower than said second threshold.

20. A method for selecting a signal processing program to be executed by a signal processor in a hearing aid having a single layer of neurons, each having one or more neighbors and being arranged in a memory device, and each neuron having a neuron vector referring to a specific acoustic situation and a neuron label referring to signal processing program associated with said specific acoustic situation, said method comprising:
   detecting an external acoustic situation;
   defining a sensor vector associated with said external acoustic situation,
   calculating a vector difference between said sensor vector and each of said neuron vectors with said processor,
   identifying that neuron providing the smallest vector difference,
   selecting, with said processor, a signal processing program referred to by a neuron label of that neuron,
   recording a number of counts for use of each signal processing program in a specific acoustic situation with a counter,
   identifying a signal processing program having the highest number of counts in said counter and a signal processing program having the second to highest number of counts in said counter, and comparing a first difference between said highest number of counts in said counter and said second to highest number of counts in said counter with a first threshold with said signal processor; and
   disabling a neuron in case associated neuron label has zero value with said signal processor.

21. A method according to claim 20 further comprising setting the value of said neuron label to zero or null in case the first difference is lower than said first threshold with said signal processor.

22. A method for selecting a signal processing program to be executed by a signal processor in a hearing aid having a single lager of neurons, each having one or more neighbors and being arranged in a memory device, and each neuron having a neuron vector referring to a specific acoustic situation and a neuron label referring to signal processing program associated with said specific acoustic situation, said method comprising:
   detecting an external acoustic situation;
   defining a sensor vector associated with said external acoustic situation,
   calculating a vector difference between said sensor vector and each of said neuron vectors with said processor,
   identifying that neuron providing the smallest vector difference, selecting, with said processor, a signal processing program referred to by a neuron label of that neuron; and
   recording a number of counts for overall use of each signal processing program with a counter, and executing that signal processing program with the highest number of counts in said counter with said signal processor.

23. A method according to claim 22 further comprising comparing a second difference between highest number of counts in said counter and number of counts for a presently running signal processing program of said counter with a second threshold, and in case the second difference is lower than said second threshold executing said presently running signal processing program with said signal processor.

24. A computer-readable medium having embodied thereon a program that, when executed, causes a signal processor in a hearing aid having a single layer of neurons, each having one or more neighbors and being arranged in a memory device, and each neuron having a neuron vector referring to a specific acoustic situation and a neuron label referring to signal processing program associated with said specific acoustic situation to perform a method for selecting a signal processing program, said method comprising
   detecting an external acoustic situation with a sensor;
   defining a sensor vector associated with said external acoustic situation,
   calculating a vector difference between said sensor vector and each of said neuron vectors with said processor,
   identifying that neuron providing the smallest vector difference,
   selecting a signal processing program referred to by a neuron label of that neuron; and
   recording a number of counts for overall use of each signal processing program with a counter, and executing that signal processing program with the highest number of counts in said counter with said signal processor.

25. A system for selecting a signal processing program to be executed by a signal processor in a hearing aid and comprising:
   a single layer of neurons each having one or more neighbors and being arranged in a memory device, and each neuron including
      a neuron vector referring to a specific acoustic situation and
      a neuron label referring to signal processing program associated with said specific acoustic situation, and
   a sensor that detects an external acoustic situation and defines a sensor vector associated with said external acoustic situation, and
   a processor that
      calculates a vector difference between said sensor vector and each of said neuron vectors,
      identifies that neuron providing the smallest vector difference, and
      selects a signal processing program referred to by a neuron label of that neuron;
   wherein the memory device does not store a map topology of said layer of neurons.

26. A method for selecting a signal processing program to be executed by a signal processor in a hearing aid having a single layer of neurons, each having one or more neighbors and being arranged in a memory device, and each neuron having a neuron vector referring to a specific acoustic situation and a neuron label referring to signal processing program associated with said specific acoustic situation, said method comprising:
   detecting an external acoustic situation;
   defining a sensor vector associated with said external acoustic situation,
   calculating a vector difference between said sensor vector and each of said neuron vectors with said processor,
   identifying that neuron providing the smallest vector difference, and
   selecting, with said processor, a signal processing program referred to by a neuron label of that neuron;
   wherein said memory device does not store a map topology of said layer of neurons.

27. A computer-readable medium having embodied thereon a program that, when executed, causes a signal processor in a hearing aid having a single layer of neurons, each having one or more neighbors and being arranged in a memory device, and each neuron having a neuron vector referring to a specific acoustic situation and a neuron label referring to signal processing program associated with said specific acoustic situation to perform a method for selecting a signal processing program, said method comprising:

detecting an external acoustic situation;

defining a sensor vector associated with said external acoustic situation,     calculating a vector difference between said sensor vector and each of said neuron vectors with said processor,     identifying that neuron providing the smallest vector difference,     selecting, with said processor, a signal processing program referred to by a neuron label of that neuron,     recording a number of counts for use of each signal processing program in a specific acoustic situation with a counter,     identifying a signal processing program having the highest number of counts in said counter and a signal processing program having the second to highest number of counts in said counter, and comparing a first difference between said highest number of counts in said counter and said second to highest number of counts in said counter with a first threshold with said signal processor; and     disabling a neuron in case associated neuron label has zero value with said signal processor.

* * * * *